United States Patent
Dash et al.

(10) Patent No.: US 10,787,474 B2
(45) Date of Patent: Sep. 29, 2020

(54) PROCESS FOR PREPARING PLATINUM ORGANOSILOXANE COMPLEXES

(71) Applicant: Dow Silicones Corporation, Midland, MI (US)

(72) Inventors: Aswini Dash, Midland, MI (US); Zhanjie Li, Midland, MI (US); Andrew Millward, Midland, MI (US); Ming-Shin Tzou, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/617,662

(22) PCT Filed: Jul. 18, 2018

(86) PCT No.: PCT/US2018/042586
§ 371 (c)(1),
(2) Date: Nov. 27, 2019

(87) PCT Pub. No.: WO2019/018464
PCT Pub. Date: Jan. 24, 2019

(65) Prior Publication Data
US 2020/0181183 A1   Jun. 11, 2020

Related U.S. Application Data

(60) Provisional application No. 62/534,955, filed on Jul. 20, 2017.

(51) Int. Cl.
*C07F 15/00* (2006.01)

(52) U.S. Cl.
CPC .................. *C07F 15/0086* (2013.01)

(58) Field of Classification Search
CPC .... C07F 15/0086; C07F 15/0006; C07F 7/02; C07F 7/003
See application file for complete search history.

(56) References Cited

U.S. PATENT DOCUMENTS

| | | | |
|---|---|---|---|
| 2,676,182 A | 4/1954 | Daudt | |
| 3,159,601 A * | 12/1964 | Ashby | C07F 15/0086 528/15 |
| 3,715,334 A * | 2/1973 | Karstedt | C07F 15/0086 528/15 |
| 3,775,452 A * | 11/1973 | Karstedt | C07F 15/0086 556/10 |
| 3,814,730 A * | 6/1974 | Karstedt | C08L 83/00 528/15 |
| 3,993,835 A * | 11/1976 | Miedaner | B05D 1/185 428/378 |
| 4,013,574 A * | 3/1977 | Leikhim | C07F 7/02 510/528 |
| 4,288,345 A * | 9/1981 | Ashby | B01J 31/124 502/158 |
| 5,175,325 A * | 12/1992 | Brown | B01J 31/124 556/136 |
| 5,312,937 A * | 5/1994 | Waier | B01J 31/1675 528/15 |
| 5,424,470 A * | 6/1995 | Bank | C07F 7/0829 556/479 |
| 6,172,252 B1 * | 1/2001 | Amako | C07F 7/1804 556/449 |
| 9,624,251 B2 * | 4/2017 | Baceiredo | C07F 7/0829 |
| 2009/0171058 A1 | 7/2009 | Kilgour | |
| 2011/0224340 A1 * | 9/2011 | Hill | C07F 9/302 524/139 |
| 2014/0249281 A1 * | 9/2014 | Hedden | C08K 5/56 526/118 |
| 2020/0148833 A1 * | 5/2020 | Li | C07F 7/0829 |

FOREIGN PATENT DOCUMENTS

| | | |
|---|---|---|
| CN | 109762024 A * | 5/2019 |
| GB | 2252771 | 2/1992 |

OTHER PUBLICATIONS

English-Language Machine Translation of CN 109762024 A (2019) (Year: 2019).*
S. Denmark et al., 3 Organic Letters (2001) (Year: 2001).*
X. Wei et al., Journal of Applied Polymer Science (2019) (Year: 2019).*
Chandra G.; La, P. Y. Organometallics 1987, 6, 191.
Fleury, L. M. et al., Org. Chem. 2013, 78, 253.
Gulinski et al. Catalysis of Hydrosilylation: Part XXIV. H2PtCl6 in Cyclohexanone as Hydrosilylation Catalyst —What is the Active Species in this Catalytic System? Faculty of Chemistry. vol. 8, 409-414 (1994).
Hg von Schnering et al., Zeitschrift fuer Anorganische und Allgemeine Chemie (2003) 629, 516-522.
Izakovich, E et al. The reaction of H2PtCl6 with acetone in the presence of quinone. X-ray and spectral studies of a chelate n-complex of platinurn(II). Metalloorganicheskaya Khimiya (1988), 1(2), 424-7.
Lewis et al., Platinum Catalysts Used in the Silicones Industry. Platinum Metals Rev., 1997, 41, (2), 66-75.
M Gorlov et al., Z.Anorg.Allg.Chem., 631, 2005, 2973.
R. Cini et al., J.Chem.Soc.,Dalton Trans., 1994, 3753.
Ramos, S. S. et al. Costa, M. D. C. Tetrahedron, 2007, 63, 12608.

* cited by examiner

*Primary Examiner* — Alexander R Pagano
(74) *Attorney, Agent, or Firm* — Catherine U. Brown

(57) ABSTRACT

A platinum organosiloxane complex is prepared by a process including 1) combining A) a platinous halide and B) a ketone, and thereafter 2) adding C) a polyorganosiloxane having, per molecule, 2 to 4 silicon bonded terminally unsaturated hydrocarbon groups having from 2 to 6 carbon. The platinum organosiloxane complex prepared by the process is useful as a hydrosilylation catalyst.

13 Claims, No Drawings

PROCESS FOR PREPARING PLATINUM ORGANOSILOXANE COMPLEXES

CROSS-REFERENCE TO RELATED APPLICATIONS

This application is a U.S. national stage filing under 35 U.S.C. § 371 of PCT Application No. PCT/US18/042586 filed on 18 Jul. 2018, currently pending, which claims the benefit of U.S. Provisional Patent Application No. 62/534,955 filed 20 Jul. 2017 under 35 U.S.C. § 119 (e). PCT Application No. PCT/US18/042586 and U.S. Provisional Patent Application No. 62/534,955 are hereby incorporated by reference.

TECHNICAL FIELD

A process forms a platinum organosiloxane complex, which is useful as a hydrosilylation reaction catalyst. More particularly, the process is robust and produces a platinum organosiloxane complex with lowered reaction processing time to achieve good yield regardless of the quality of starting materials as compared to previous methods.

BACKGROUND

One method for preparing a platinum organosiloxane complex includes concurrently combining a platinous halide, a polar organic liquid and an organosiloxane having silicon bonded organic groups with terminal olefinic unsaturation under conditions to react the platinous halide with the organosiloxane. This method may lack robustness in that various factors, such as crystallite size and/or quality of the platinous halide can lower the yield of platinum organosiloxane complex.

SUMMARY

A process can be used to form a product comprising a platinum organosiloxane complex. The process comprises:
1) combining by mixing for at least 2 hours at 25° C. to 90° C. or by milling for at least 1 hour at 25° C. to 90° C.
   A) a platinous halide, and
   B) a ketone, and thereafter;
2) adding starting materials comprising
   C) a polyorganosiloxane having, per molecule, 2 to 4 silicon bonded terminally unsaturated organic groups having from 2 to 6 carbon atoms and any remaining silicon bonded organic groups being monovalent hydrocarbon groups of 1 to 12 carbon atoms.

DETAILED DESCRIPTION

Process Steps

The process described herein forms a product comprising a platinum organosiloxane complex, which is useful as a hydrosilylation reaction catalyst. The process comprises:
1) combining by mixing for at least 2 hours at 25° C. to 90° C. or by milling for at least 1 hour at 25° C. to 90° C. starting materials A) and B), where
   starting material A) is a platinous halide, and
   starting material B) is a ketone, and thereafter;
2) adding starting materials comprising
   starting material C), a polyorganosiloxane having, per molecule, 2 to 4 silicon bonded terminally unsaturated organic groups having from 2 to 6 carbon atoms and any remaining silicon bonded organic groups being monovalent hydrocarbon groups of 1 to 12 carbon atoms. The process may optionally further comprise adding starting material D), an enone additive, during step 1). The process may optionally further comprise adding starting material E), an additional polyorganosiloxane, during and/or after step 2).

Step 1)

Step 1) of the process described above may be performed at ambient or elevated temperature. For example, the starting materials may be combined at room temperature of 25° C. Alternatively, the starting materials may be combined with heating, up to a temperature that does not degrade the platinous halide selected as starting material A) and/or that does not remove too much of the ketone selected as starting material B) (and/or that does not remove too much of the enone additive selected as starting material D), when present). In step 1), the starting materials may be combined by mixing at 25° C. to 90° C., e.g., either by soaking starting material A) in starting material B) (and starting material D), when present) in a liquid phase and/or by heating liquid starting material B) (and starting material D), when present) in the presence of starting material A). When step 1) is performed at lower temperatures, such as room temperature of 25° C., step 1) may be performed for relatively long periods of time, such as up to several weeks, alternatively up to 24 hours. Step 1) may be performed by heating the starting materials for at least 8 hours at a temperature of 30° C. or less. Alternatively, step 1) may be performed by heating the starting materials for 2 to 8 hours at a temperature of 85° C. or more, alternatively 2 to 5 hours at a temperature of 85° C. Milling may be performed by any convenient means, such as adding inert particles, such as glass beads, to a container containing the starting materials in step 1) and subjecting the container to rolling or agitation.

The starting materials in step 1) are free of polyorganosiloxanes. "Free of polyorganosiloxanes" means that polyorganosiloxane species, such as starting materials C) and E) described herein, are not added during step 1) and/or that the starting materials used in step 1) contain no detectable amount of a polyorganosiloxane by GC of the liquid and/or filtration and analysis of any solids with SEM. Alternatively, the reaction mixture after step 1) may be analyzed by FTIR analysis to determine the amount of water formed as a by-product and the amount of unreacted platinum dichloride.

Step 2)

Step 2) is typically performed with heating. Step 2) is performed at a temperature that does not degrade the platinum organosiloxane complex. The exact temperature depends on various factors including the time and temperature selected for step 1), the quality of the platinous halide, and whether an enone additive is used. However, step 2) may be performed by heating at a temperature up to 90° C. Alternatively, step 2) may be performed by heating for 1 to 8 hours at a temperature of 55° C. to 90° C. Alternatively, step 2) may be performed by heating at 50° C. to 85° C. for 2 hours to 12 hours, alternatively 2.5 hours to 4 hours. An additional amount of starting material B) may be added in step 2).

Step 3)

Step 2) of the process produces a reaction mixture. Step 3) of the process described herein comprises neutralizing the reaction mixture formed in step 2). Neutralizing the mixture may be accomplished by mixing the reaction product with a hydrocarbon solvent, such as heptane, toluene, or xylene and a basic buffer solution at elevated temperature. The exact temperature selected for step 3) depends on various factors including the volatility of the ketone selected for starting material B), however, step 3) may be performed at 40° C. to 50° C.

The buffer solution comprises deionized water and a salt such as sodium bicarbonate, calcium carbonate, magnesium oxide, or magnesium carbonate. Alternatively, the buffer solution comprises sodium bicarbonate.

Step 4)

The platinum organosiloxane complex may be recovered from the neutralized reaction product formed in step 3) by any convenient means, such as filtering, stripping and/or distillation. Pressure may be reduced to facilitate removal one or more starting materials and/or by-products.

Optional, Additional Process Steps

It is not necessary to dry the starting materials before their use in this process, however, drying one or more of the starting materials may be performed as an additional step before step 1) and/or step 2). In one embodiment, step 1) and/or step 2) is performed in the absence of added water. After step 2), the reaction mixture may be stripped and/or distilled to remove excess water, ketone, and/or excess polyorganosiloxane. Stripping may be performed before step 3) and/or after step 3). Pressure may be reduced to facilitate removal one or more starting materials and/or by-products. Alternatively, the reaction mixture may be filtered after step 1) (e.g., to remove inert particles used for milling, if any) and/or after step 2) (e.g., to remove unreacted solids and/or solid by-products, if any).

The following starting materials are used in the process described herein.

A) Platinous Halide

Starting material A) used in the process described above is a platinous halide. The platinous halide has general formula $Pt_aX_b$, where subscript a is 1 to 6 and subscript b is 2 to 12. Each X is independently a halogen atom, such as Br, Cl, F or I; alternatively Br, Cl or F; alternatively Br or Cl; and alternatively Cl. The particle size and/or crystallite size of starting material A) is not critical. Starting material A) may include an impurity, for example, starting material A) may contain up to 10% of zero valent platinum ($Pt^0$). Alternatively, starting material A) may contain up to 5%, alternatively up to 0.6%, and alternatively up to 0.3% of zero valent platinum ($Pt^0$). Alternatively, starting material A) may contain 0.3% to 1%, and alternatively 0.3% to 0.6% of zero valent platinum ($Pt^0$). Examples of suitable platinous halides for starting material A) include platinum dichloride of formula $Pt_6Cl_{12}$. Platinous halides, such as the platinum dichloride are commercially available from Heraeus, Johnson Matthey or Sigma Aldrich.

B) Ketone

Starting material B) is a ketone. The ketone may have 4 to 8 carbon atoms. Starting material B) may be acetone and/or methyl ethyl ketone. Alternatively, starting material B) may be methyl ethyl ketone. Starting material B) may be used in an amount of 1 to 20 moles of ketone per mole of platinous halide.

C) Polyorganosiloxane

Starting material C) is a polyorganosiloxane having, per molecule, 2 to 4 silicon bonded terminally unsaturated hydrocarbon groups having from 2 to 6 carbon atoms and any remaining silicon bonded organic groups being monovalent hydrocarbon groups of 1 to 12 carbon atoms. Such unsaturated groups include alkenyl groups such as vinyl, allyl, butenyl, and/or hexenyl, alternatively vinyl; or alkynyl groups such as propynyl and/or butynyl. The remaining silicon bonded organic groups in the polyorganosiloxane may be alkyl, aryl, and/or phenyl groups. Alkyl groups are exemplified by methyl, ethyl, propyl and butyl; alternatively methyl or ethyl; and alternatively methyl. The polyorganosiloxane may be linear, branched, cyclic, or resinous; alternatively linear or cyclic; alternatively resinous; and alternatively linear. The polyorganosiloxane may be, for example, a vinyl terminated polydimethylsiloxane, methyl-vinyl cyclotetrasiloxane, trimethylsiloxy-terminated (dimethylsiloxane/methylvinylsiloxane) copolymer, and/or (dimethylsiloxane/methylvinylphenylsiloxane) copolymer. Specific examples include 1,3-divinyl tetramethyldisiloxane. The polyorganosiloxane may have unsaturated groups present on adjacent silicon atoms. Resinous polyorganosiloxanes suitable for starting material C) may comprise unit formula: $(HO_{1/2})_v(R^{11}_3SiO_{1/2})_x(R^{12}_wR^{11}_{(3-w)}SiO_{1/2})_y(SiO_{4/2})_z$, where each $R^{11}$ is independently a monovalent hydrocarbon group of 1 to 12 carbon atoms (as described above), each $R^{12}$ is independently a terminally unsaturated hydrocarbon group (as described above), subscript v≥0, subscript w is 1 to 3, subscript x≥0, subscript y>0, and subscript z>0. Alternatively, subscript x is 0 to 200, subscript y is 1 to 202, and subscript z is 1 to 100. Alternatively, each $R^{11}$ is a methyl or phenyl group and each $R^{12}$ is a vinyl group.

The resinous polyorganosiloxane may contain an average of 3 to 30 mole percent of unsaturated groups, alternatively 0.1 to 30 mole percent, alternatively 0.1 to 5 mole percent, alternatively 3 to 100 mole percent. The mole percent of unsaturated groups is the ratio of the number of moles of unsaturated group-containing siloxane units in the resinous polyorganosiloxane to the total number of moles of siloxane units in the resinous polyorganosiloxane, multiplied by 100.

Methods of preparing resinous polyorganosiloxanes are known in the art. For example, resinous polyorganosiloxane may be prepared by treating a resin copolymer produced by the silica hydrosol capping process of Daudt, et al. with at least an alkenyl-containing endblocking reagent. The method of Daudt et al., is disclosed in U.S. Pat. No. 2,676,182.

The method of Daudt, et al. involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers may contain from 2 to 5 percent by weight of hydroxyl groups.

The polyorganosiloxane may be used in an amount of at least 3.5 moles of polyorganosiloxane per mole of platinous halide; alternatively 3.5 moles to 150 moles of polyorganosiloxane per mole of platinous halide; alternatively 3.5 moles to 130 moles of polyorganosiloxane per mole of platinous halide; alternatively 3.5 moles to 20 moles of polyorganosiloxane per mole of platinous halide; and alternatively 5 moles to 15 moles of polyorganosiloxane per mole of platinous halide.

D) Enone Additive

Starting material D) is an enone additive that may optionally be included in the process in step 1) in addition to the other starting materials, and in addition to any enone compound that may form by rearrangement/reaction of the ketone selected for starting material B). The enone additive for starting material D) may be distinct from any compound formed by rearrangement/reaction of the ketone and/or the enone additive may be an additional amount of a compound that is the same as a rearrangement/reaction product of the ketone selected for starting material B). The enone additive is a compound of a compound of formula (I) and/or formula (II), where formula (I) is

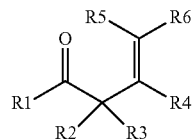

and formula (II) is

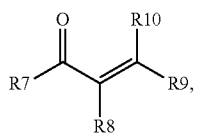

where R1 to R10 are each independently selected from hydrogen, an alkyl group having from 1 to 6 carbon atoms, and a phenyl group, or any two of R1 to R10 may combine to form one or more cyclic groups; with the proviso that when R1 is methyl and one of R2 and R3 is hydrogen and the other of R2 and R3 is methyl, and R5 and R6 are both hydrogen; then R4 is not methyl. Alternatively, each of R1 to R10 is independently selected from H and a methyl group. Alternatively, one of R5 and R6 is hydrogen and the other of R5 and R6 is an alkyl group, such as methyl. The enone additive may have 4 to 20 carbon atoms. Alternatively, R1 and R2 may combine to form a carbocyclic group. Alternatively, R4 and R6 may combine to form a carbocyclic group. Alternatively, both R1 and R2, and R4 and R6, may combine to form carbocyclic groups. Examples of suitable enone additives include (C1) (4E)-3,4-Dimethyl-4-hexen-2-one; (C2) (5E)-5-Methyl-5-hepten-3-one; (C3) 4-Penten-2-one; (C4) 3-Methyl-4-penten-2-one; (C5) 4-Methyl-4-penten-2-one; (C6) 3,3-Dimethyl-4-penten-2-one; (C7) 3,3,4-Trimethyl-4-penten-2-one; (C8) (4Z)-3,4-Dimethyl-4-hexen-2-one; (C9) 2-(1-cyclohexenyl)cyclohexanone (commercially available from Alfa Aesar); (C10) 3-Buten-2-one (commercially available from Aldrich); (C11) (3E)-3-Penten-2-one (commercially available from Aldrich); (C12) (3E)-3-Methyl-3-penten-2-one (commercially available from Aldrich); (C13) 4-Methyl-3-penten-2-one (commercially available from Aldrich); and two or more of (C1), (C2), (C3), (C4), (C5), (C6), (C7), (C8), (C9), (C10), (C11), (C12), and (C13). When methyl ethyl ketone is used as starting material B), then the enone additive may be selected from the group consisting of (C3), (C4), (C5), (C6), (C7), (C8), (C9), (C10), (C11), (C12), (C13), and two or more of C3), (C4), (C5), (C6), (C7), (C8), (C9), (C10), (C11), (C12), and (C13). Suitable enone additives of formula (I) include (C1), (C2), (C3), (C4), (C5), (C6), (C7), (C8), and (C9). Suitable enone additives of formula (II) include (C10), (C11), (C12), and (C13). Starting material D) is used in an amount 0.1% to 50%, alternatively 1% to 10% based on combined weights of liquid starting materials (e.g., combined amounts of starting materials B), C), D) and when present, E), described below).

E) Additional Polyorganosiloxane

Starting material E) is an additional polyorganosiloxane, other than the polyorganosiloxane selected for starting material C). The additional polyorganosiloxane may be added in an amount up to 25% based on weight of the reaction mixture formed in step 1) of the process described above. Starting material E) may be an additional amount of a polyorganosiloxane selected as starting material C). Alternatively, starting material E) may be a non-functional polyorganosiloxane, such as trimethylsiloxy-terminated polydimethylsiloxane. Alternatively, a mixture of a non-functional polyorganosiloxane and an additional amount of a polyorganosiloxane selected as starting material C) may be used as starting material E). Starting material E), when present, may be used in an amount up to 25% based on weight of all starting materials.

EXAMPLES

These examples are intended to illustrate some embodiments of the invention and should not be interpreted as limiting the scope of the invention set forth in the claims. Abbreviations used herein are defined below in Table 1.

TABLE 1

| Abbreviation | Definition |
|---|---|
| DVTMDS | 1,3-divinyl-1,1,3,3-tetramethyldisiloxane |
| FTIR | Fourier Transform Infra-Red |
| g | grams |
| GC | Gas chromatography |
| h | hours |
| L1 | (4E)-3-4-Dimethyl-4-hexen-2-one |
| L2 | (5E)-5-Methyl-5-hepten-3-one |
| L3 | 4-Penten-2-one |
| L4 | 3-Methyl-4-penten-2-one |
| L5 | 4-Methyl-4-penten-2-one |
| L6 | 3,4-Dimethyl-4-penten-2-one |
| L7 | 3,3-Dimethyl-4-penten-2-one |
| L8 | 3,3,4-Trimethyl-4-penten-2-one |
| L9 | A mixture of 85% (4Z)-3,4-Dimethyl-4-hexen-2-one and 15% (4E)-3,4-Dimethyl-4-hexen-2-one |
| L10 | 2-(1-cyclohexenyl)cyclohexanone from Alfa Aesar; IUPAC name is 1,1'-Bi(cyclohexan)-1'-en-2-one |
| L11 | 3-Buten-2-one from Aldrich |
| L12 | (3E)-3-Penten-2-one from Aldrich |
| L13 | (3E)-3-Methyl-3-penten-2-one from Aldrich |
| L14 | 4-Methyl-3-penten-2-one from Aldrich |
| M | Molar |
| MEK | Methyl ethyl ketone |
| mL | Milliliters |
| NMR | Nuclear Magnetic Resonance |
| PtCl2 | Platinum dichloride |
| RPM | Revolutions per minute |
| RT | Room temperature of 25° C. |
| SEM | Scanning electron microscopy |
| THF | Tetrahydrofuran |
| um | Micrometer |

In this Comparative Example 1, a 100 mL 3-neck flask was assembled (with no grease) with a 12" water-jacketed reflux column, a thermocouple, a glass stopper, a magnetic stirbar and a heating mantle, blanketed with nitrogen. PtCl2, MEK and DVTMDS were combined in the flask in a 1:5:10 weight ratio. The mixture was stirred and heated to 85° C., making sure not to overshoot by more than 2° C. The mixture was then refluxed for 8 h (starting time when mixture reached 84° C.) with water cooling on the column. After 8 h, heating and insulation were removed to cool the contents of the flask. When cooled to <30° C., the contents of the flask were filtered through a pre-weighed 0.45 um membrane. The dried membrane and solids were weighed to obtain the net weight of captured solids. The weight of the residue was divided by the starting weight of PtCl2, and the resulting value was subtracted from 100%. The result was recorded as % Yield. This example was repeated using 19 different batches of PtCl2 received from a vendor.

In this Comparative Example 2, comparative example 1 was repeated using batch 21 of PtCl2, except that refluxing was performed for 8 hours and continued up to 13 hours.

In this Comparative Example 3, comparative example 1 was repeated using a different batch (20) of PtCl2 and heating at 85° C. for 1 hour to 12 hours. The flask contents were mixed using a magnetic stir bar at 500 RPM.

TABLE 2

| Example | Reaction time | PtCl2 batch | % Yield |
|---|---|---|---|
| Comparative Example 1 | 8 | 1 | Opaque |
| | 8 | 1 | Opaque |
| | | | 94.7 |
| | 7 | 1 | 88.5 |
| | 8 | 2 | 97.2 |
| | 8 | 3 | 89.2 |
| | 8 | 3 | 98.6 |
| | 8 | 4 | 85.4 |
| | 8 | 5 | 86.3 |
| | 8 | 6 | 89.6 |
| | 8 | 7 | 90.0 |
| | 8 | 8 | 85.3 |
| | 8 | 9 | 96.6 |
| | 8 | 3 | 97.8 |
| | 8 | 4 | 85.0 |
| | 8 | 3 | 83.5 |
| | 8 | 2 | 95.3 |
| | 8 | 3 | 82.6 |
| | 8 | 6 | 85.0 |
| | 8 | 7 | 87.0 |
| | 8 | 8 | 84.8 |
| | 8 | 5 | 86.5 |
| | 8 | 9 | 97.2 |
| | 8 | 10 | 83.33 |
| | 8 | 11 | 77.67 |
| | 8 | 12 | 81.36 |
| | 8 | 13 | 81.61 |
| | 8 | 14 | 84.23 |
| | 8 | 15 | 77.52 |
| | 8 | 16 | 80.58 |
| | 8 | 13 | 82.3 |
| | 8 | 17 | 93.71 |
| | 8 | 12 | 73.87 |
| | 8 | 10 | 81.64 |
| | 8 | 11 | 75.1 |
| | 8 | 15 | 84.15 |
| | 8 | 16 | 82.55 |
| | 8 | 18 | 90.58 |
| | 8 | 19 | 87.15 |
| | 8 | 14 | 88.29 |
| | 8 | 11 | 78.03 |
| | 8 | 16 | 81.37 |
| | 8 | 18 | 90.13 |
| | 8 | 19 | 87.95 |
| | 8 | 15 | 80.31 |
| | 8 | 14 | 87.19 |
| | 8 | 17 | 92.5 |
| | 8 | 18 | 90.76 |
| | 8 | 13 | 86.87 |
| | 8 | 17 | 94.33 |
| | 8 | 12 | 78.49 |
| | 8 | 19 | 87.19 |
| | 8 | 10 | 82.68 |

TABLE 2-continued

| Example | Reaction time | PtCl2 batch | % Yield |
|---|---|---|---|
| Comparative Example 2 | 8 | 21 | ~80% |
| | 13 | 21 | ~100% |
| Comparative Example 3 | 1 | 20 | 22.4 |
| | 4 | 20 | 60.3 |
| | 8 | 20 | 83.0 |
| | 12 | 20 | 98.0 |

Comparative Example 1 shows that % Yield varies widely with different batches of PtCl2. Without wishing to be bound by theory, it is thought that batch quality of PtCl2 can impact conversion of the starting materials to form platinum organosiloxane complexes in this process, with poorer batch quality slowing process time and/or reducing % Yield. Comparative Example 3 shows that long process time (12 h) is required to achieve high % Yield under the conditions tested.

In this Example 1, MEK (5 g) was gently mixed with PtCl2 (1 g) in a vial and sat at ambient temperature for 1 or 3 weeks without agitation. This PtCl2 and MEK were transferred to a 100 ml flask with DVTMDS (10 g) and heated in a Radley's parallel reactor at 85° C. The solutions were agitated with a magnetic stir bar at 500 RPM. Flasks were checked during reaction to see if the solution turned to translucent liquid.

In this Example 2, a 100 mL 3-neck flask was assembled (no grease) with a 12" water-jacketed reflux column, a thermocouple, a glass stopper, a magnetic stirbar and a heating mantle, blanketed with nitrogen. PtCl2 (2 g) and MEK (10 g) were combined in the flask. The mixture was stirred for 16 h at RT. Then DVTMDS (20 g) was added and the flask contents heated to 85° C., making sure not to overshoot by more than 2° C. The mixture was then refluxed for 8 h (starting time when mixture reached 84° C.) with water cooling on the column. After 8 h, heating and insulation were removed to cool the contents of the flask. After cooling to <30° C., the contents of the flask were filtered through a pre-weighed 0.45 um membrane. The dried membrane and solids were weighed to obtain the net weight of captured solids. The weight of the residue was divided by the starting weight of PtCl2, and the resulting value was subtracted from 100%. The result was recorded as % Yield.

In this Example 3, step 1) of the process described herein was either done in a 20 mL vial first or directly in the 100 mL flask in the Radleys parallel reactor. If the mixing step was in a 20 mL vial, PtCl2 (1.000±0.002 g) was first pre-weighed in a 20 mL vial, followed by mixing with 5 g MEK, and stirred by stirbar at 25° C., 55° C., or 85° C. for 4 to 16 h. After step 1), the PtCl2/MEK solution was transferred to a 100 mL Radleys flask followed by rinsing the vial with 10 g DVTMDS to transfer any residual PtCl2. Step 2) was then performed by heating at 85° C. for 1 to 12 h. The solutions were agitated with a magnetic stir bar at 500 RPM. The resulting reaction products were filtered, and % Yield was calculated as described above. The results of Examples 1-3 are in Table 3, below.

TABLE 3

Mixing Results

| | Step 1) | | | | | | |
|---|---|---|---|---|---|---|---|
| | Mixing Time (hours) | Mixing Temp (C) | Step 2) Time (hours) | PtCl2 batch | PtCl2 (g) | net solids (g) | % Yield |
| Example 1 | 1 week | | 4 | Not reported | Not reported | Not reported | 99.1 |
| | 1 week | | 4 | Not reported | Not reported | Not reported | 98.7 |

TABLE 3-continued

Mixing Results

| | Step 1) | | Step 2) | | | | |
|---|---|---|---|---|---|---|---|
| | Mixing Time (hours) | Mixing Temp (C) | Time (hours) | PtCl2 batch | PtCl2 (g) | net solids (g) | % Yield |
| | 3 weeks | | 2.5 | Not reported | Not reported | Not reported | 99.1 |
| | 3 weeks | | 2.5 | Not reported | Not reported | Not reported | 99.1 |
| Example 2 | 16 | 25 | 8 | 1 | 1.98 | | Translucent |
| | 16 | 25 | 8 | 1 | 1.98 | 0.023 | Translucent 98.8 |
| | 16 | 25 | 7 | 1 | 2.02 | 0.020 | 99.0 |
| | 1 | 50 | 8 | 1 | 2.01 | 0.120 | 94.0 |
| | 1 | 70 | 8 | 1 | 2.04 | 0.114 | 94.4 |
| Example 3 | 4 | 85 | 4 | 20 | 1.001 | 0.0107 | 99.0 |
| | 4 | 85 | 8 | 20 | 1.001 | 0.0070 | 99.4 |
| | 8 | 25 | 1 | 20 | 1.001 | 0.5132 | 48.8 |
| | 8 | 25 | 4 | 20 | 1.001 | 0.0236 | 97.7 |
| | 8 | 25 | 8 | 20 | 1.000 | 0.0067 | 99.3 |
| | 8 | 25 | 12 | 20 | 1.001 | 0.0055 | 99.6 |
| | 8 | 55 | 1 | 20 | 1.002 | 0.5790 | 42.3 |
| | 8 | 55 | 4 | 20 | 1.002 | 0.0089 | 99.3 |
| | 8 | 55 | 8 | 20 | 1.000 | 0.0074 | 99.3 |
| | 8 | 55 | 12 | 20 | 1.002 | 0.0053 | 99.7 |
| | 8 | 85 | 1 | 20 | 1.001 | 0.1773 | 82.4 |
| | 8 | 85 | 4 | 20 | 1.002 | 0.0103 | 99.2 |
| | 8 | 85 | 8 | 20 | 1.000 | 0.0073 | 99.3 |
| | 8 | 85 | 12 | 20 | 1.000 | 0.0073 | 99.3 |
| | 16 | 25 | 1 | 20 | 1.001 | 0.3286 | 67.2 |
| | 16 | 25 | 4 | 20 | 1.001 | 0.0081 | 99.3 |
| | 16 | 25 | 8 | 20 | 1.002 | 0.0065 | 99.6 |
| | 16 | 25 | 12 | 20 | 1.003 | 0.0064 | 99.7 |
| | 16 | 55 | 1 | 20 | 1.000 | 0.2594 | 74.1 |
| | 16 | 55 | 4 | 20 | 1.000 | 0.0072 | 99.3 |
| | 16 | 55 | 8 | 20 | 1.000 | 0.0067 | 99.3 |
| | 16 | 55 | 12 | 20 | 1.000 | 0.0058 | 99.4 |
| | 16 | 85 | 1 | 20 | 1.000 | 0.0687 | 93.1 |
| | 16 | 85 | 4 | 20 | 1.001 | 0.0495 | 95.2 |
| | 16 | 85 | 8 | 20 | 1.003 | 0.0728 | 93.0 |
| | 16 | 85 | 12 | 20 | 1.004 | 0.1397 | 86.4 |

Comparing the results in Table 2 for Comparative Example 3 and Table 3 for Example 3 shows that total process time can be reduced and/or yield can be increased using the process described herein. Comparative Example 1, using PtCl2 batch 1 in Table 2 shows that poor Yield was achieved in certain runs. Opaque reaction product indicates a high amount of solids that did not react to form a platinum organosiloxane complex. In contrast, Example 2 in Table 3 achieved better Yield than Comparative Example 3 using the same batch of PtCl2. Comparative Example 3, using PtCl2 batch 20 in Table 2 shows that long process time (12 hours) was required to achieve high yield (98%). Example 3 using the same batch of PtCl2 in Table 3 showed that yields higher than 98% were achieved using the process described herein with shorter total process times. For example, with a 4 h mixing time at 85° C. in step 1) and a 4 h heating time in step 2), better Yield (99%) was achieved in a shorter (8 h) process time.

In this example 4, milling was tested. 10 g PtCl2, 20 g MEK and 40 g 2 mm borosilicate glass beads (Chemglass) were weighed into a 250 mL necked borosilicate bottle on an open-air benchtop. The bottle was closed with a Teflon-lined cap, and the cap fastened in place with electrical tape. The bottle was placed on a rolling mill between 60 and 100 RPM for 4 to 24 hours. The contents of the flask were then separated from the beads, and filtered.

A 100 mL 3-neck flask was assembled (no grease) with a 12" water-jacketed reflux column, a thermocouple, a glass stopper, a magnetic stirbar and a heating mantle, blanketed with nitrogen. This damp filtered material was combined with MEK and DVTMDS in the flask in a 1:5:10 weight ratio. The contents of the flask were stirred and heated to 85° C., making sure not to overshoot by more than 2° C. The contents of the flask were then refluxed for 4 hours (starting time when flask contents reached 84° C.) with water cooling on the column.

In this example 5, milling was tested. 10 g PtCl2, 20 g MEK and 50 g 2 mm borosilicate glass beads (Chemglass) were weighed into a 250 mL necked borosilicate bottle on an open-air benchtop. The bottle was closed with a Teflon-lined cap, and the cap fastened in place with electrical tape. The bottle was placed on a rolling mill between 60 and 100 RPM for 4 to 24 hours. The contents of the flask were then separated from the beads, and filtered. The filtered material was dried in flowing nitrogen overnight.

A 100 mL 3-neck flask was assembled (no grease) with a 12" water-jacketed reflux column, a thermocouple, a glass stopper, a magnetic stirbar and a heating mantle, blanketed with nitrogen. This dried filtered material was combined with MEK and DVTMDS in the flask in a 1:5:10 weight ratio. The contents of the flask were stirred and heated to 85° C., making sure not to overshoot by more than 2° C. The mixture was then refluxed for 4 to 5 hours (starting time when mixture reached 84° C.) with water cooling on the column. Heating and insulation were then removed to cool the contents of the flask. Once the temperature was <30° C., the contents of the flask were filtered through a pre-weighed 0.45 um membrane. The dried membrane and solids were weighed to obtain the net weight of captured solids, and % Yield was calculated as described above. The results of examples 4 and 5 are shown below in Table 4.

TABLE 4

| Example | Step 1) Mill time (h) | Step 2) time (h) | PtCl2 (g) | net solids (g) | % Yield |
|---|---|---|---|---|---|
| 4 | 15 | 4 | 2.00 | — | transparent |
| 5 | 24 | 4 | 2.0 | 0.016 | 99.2 |
| 5 | 24 | 5 | 2.0 | 0.017 | 99.2 |
| 5 | 4 | 4 | 2.02 | 0.080 | 96.0 |
| 5 | 4 | 5 | 2.03 | 0.020 | 99.0 |

Examples 4 and 5 show that milling the PtCl2 in the presence of MEK improves yield with low processing time at the conditions tested.

INDUSTRIAL APPLICABILITY

With relatively low processing times as compared to previous processes, high conversion of the starting materials to form the platinum organosiloxane complex can be achieved by the process described herein. Without wishing to be bound by theory, it is thought that the present process is robust in that quality of the platinous halide selected for starting material A) is not critical to achieve the yields of the present process. The platinous halide useful as starting material A) may contain up to 10% zero valent platinum ($Pt^0$) without expectation of a detrimental effect on conversion achieved with the present process. In addition, the Yield of the present process is not dependent upon particle size and/or crystallite size of the platinous halide selected for starting material A), as may have been required for previous processes.

Definitions and Usage of Terms

All amounts, ratios, and percentages are by weight unless otherwise indicated. The amounts of all ingredients in a composition total 100% by weight. The Brief Summary of the Invention and the Abstract are hereby incorporated by reference. The articles 'a', 'an', and 'the' each refer to one or more, unless otherwise indicated by the context of specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

"Alkyl" means an acyclic, branched or unbranched, saturated monovalent hydrocarbon group. Examples of alkyl groups include methyl, ethyl, propyl, 1-methylethyl, butyl, 1-methylpropyl, 2-methylpropyl, 1,1-dimethylethyl, 1-methylbutyl, 1-ethylpropyl, pentyl, 2-methylbutyl, 3-methylbutyl, 1,2-dimethylpropyl, 2,2-dimethylpropyl, hexyl, heptyl, 2-ethylhexyl, octyl, nonyl, and decyl; and as well as other branched saturated monovalent hydrocarbon groups with 6 or more carbon atoms. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

"Alkenyl" means an acyclic, branched, or unbranched monovalent hydrocarbon group, where the monovalent hydrocarbon group has a double bond. Alkenyl groups include ethenyl, allyl, propenyl, butenyl, and hexenyl. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means an acyclic, branched, or unbranched monovalent hydrocarbon group, where the monovalent hydrocarbon group has a triple bond. Alkynyl groups include ethynyl, propynyl, and butynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a hydrocarbon group derived from an arene by removal of a hydrogen atom from a ring carbon atom. Aryl is exemplified by, but not limited to, phenyl and naphthyl. Aryl groups have at least 5 carbon atoms. Monocyclic aryl groups may have 5 to 9 carbon atoms, alternatively 6 to 7 carbon atoms, and alternatively 6 carbon atoms. Polycyclic aryl groups may have 10 to 17 carbon atoms, alternatively 10 to 14 carbon atoms, and alternatively 12 to 14 carbon atoms.

"Carbocycle" and "carbocyclic" refer to a hydrocarbon ring. Carbocycles may be monocyclic or polycyclic, e.g., bicyclic or with more than two rings. Bicyclic carbocycles may be fused, bridged, or spiro polycyclic rings. Carbocycles have at least 3 carbon atoms. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated (e.g., cyclopentane or cyclohexane), partially unsaturated (e.g., cyclopentene or cyclohexene), or fully unsaturated (e.g., cyclopentadiene or cycloheptatriene).

"Cycloalkyl" refers to a saturated hydrocarbon group including a carbocycle. Cycloalkyl groups are exemplified by cyclobutyl, cyclopentyl, cyclohexyl, and methylcyclohexyl. Cycloalkyl groups have at least 3 carbon atoms. Monocyclic cycloalkyl groups may have 3 to 9 carbon atoms, alternatively 4 to 7 carbon atoms, and alternatively 5 to 6 carbon atoms. Polycyclic cycloalkyl groups may have 7 to 17 carbon atoms, alternatively 7 to 14 carbon atoms, and alternatively 9 to 10 carbon atoms.

The invention claimed is:

1. A process for forming a product comprising a platinum organosiloxane complex, wherein the process comprises:
   1) combining by mixing for at least 2 hours at 50° C. to 90° C. or by milling for at least 1 hour at 50° C. to 90° C.
      A) a platinous halide, and
      B) a ketone, where milling is performed by adding inert particles to a container containing the starting materials in step 1) and subjecting the container to rolling or agitation, and thereafter;
2) adding starting materials comprising
C) a polyorganosiloxane having, per molecule, 2 to 4 silicon bonded terminally unsaturated organic groups having from 2 to 6 carbon atoms and any remaining silicon bonded organic groups being monovalent hydrocarbon groups of 1 to 12 carbon atoms;

wherein Yield of the present process is not dependent upon particle size and/or crystallite size of the platinous halide selected for starting material A).

2. The process of claim 1, where the platinous halide is platinum dichloride.

3. The process of claim 1, where the platinous halide comprises 0.3% to 10% zero valent platinum.

4. The process of claim 1, where the ketone is methyl ethyl ketone.

5. The process of claim 1, where the polyorganosiloxane is a vinyl terminated polydimethylsiloxane.

6. The process of claim 1, further comprising: adding D) an enone additive during step 1).

7. The process of claim 6, where D) the enone additive is a compound of formula (I) and/or formula (II), where formula (I) is

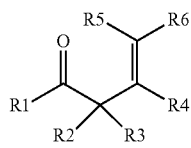

and formula (II), is

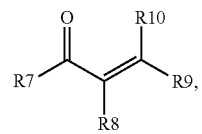

where R1 to R10 are each independently selected from hydrogen, an alkyl group having from 1 to 6 carbon atoms, or a phenyl group, or where any two of R1 to R10 may combine to form one or more carbocyclic groups; with the proviso that when R1 is methyl, one of R2 and R3 is hydrogen and the other of R2 and R3 is methyl, and R5 and R6 are both hydrogen; then R4 is not methyl.

8. The process of claim 1, where step 1) is performed from 4 to 16 hours before step 2).

9. The process of claim 1, where step 1) is performed by heating for 5 to 8 hours at a temperature of 85° C. to 90 C.

10. The process of claim 1, where step 2) is performed by heating at 50° C. to 85° C. for 2 to 12 hours.

11. The process of claim 1, further comprising step 3) neutralizing the product formed by step 1).

12. The process of claim 1, further comprising 4) recovering the platinum organosiloxane complex.

13. The process of claim 2, where the platinous halide comprises 0.3% to 10% zero valent platinum.

* * * * *